Patented May 8, 1923.

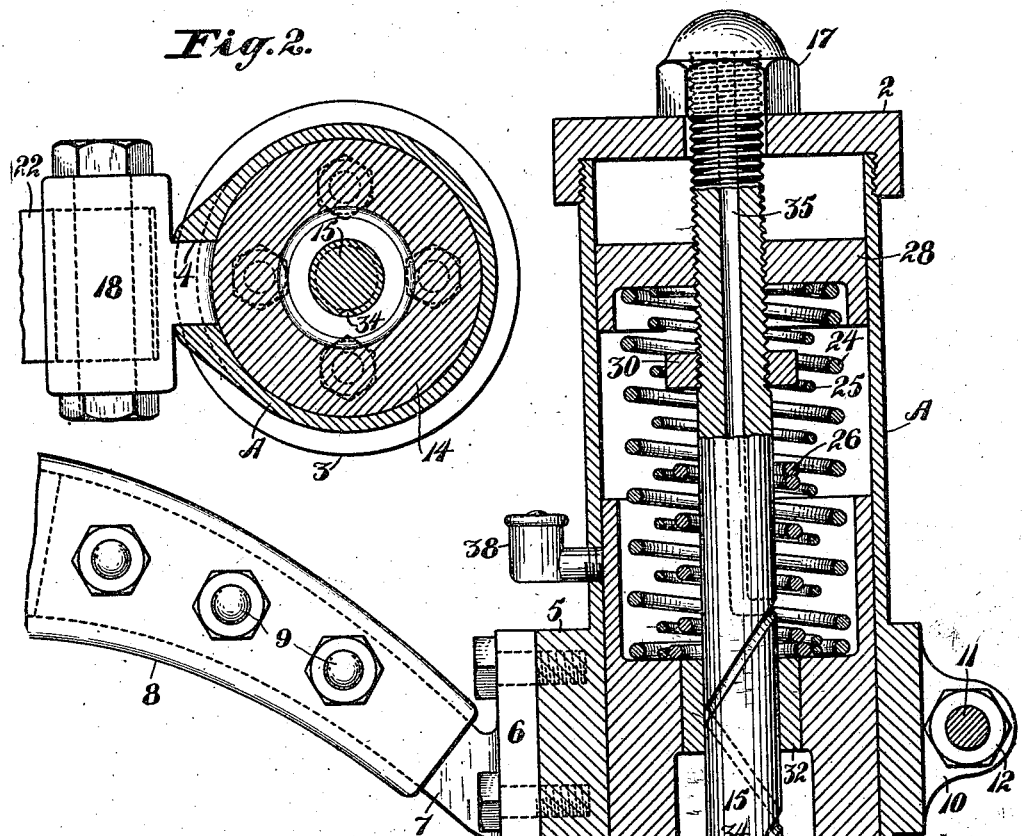
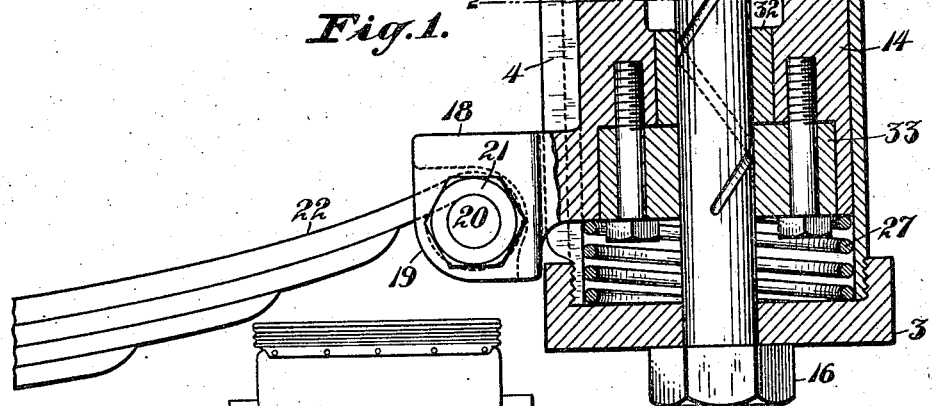
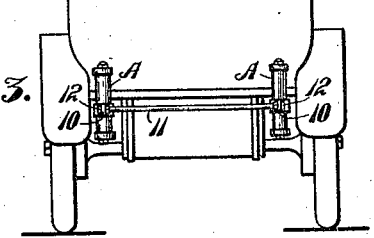

1,454,391

UNITED STATES PATENT OFFICE.

ZELMERE P. LOYD, OF COALINGA, CALIFORNIA, ASSIGNOR TO LOYD MANUFACTURING CO., OF OAKLAND, CALIFORNIA, A CORPORATION OF CALIFORNIA.

SHOCK ABSORBER.

Application filed January 14, 1920. Serial No. 351,328.

*To all whom it may concern:*

Be it known that I, ZELMERE P. LOYD, a citizen of the United States, residing at Coalinga, in the county of Fresno and State of California, have invented new and useful Improvements in Shock Absorbers, of which the following is a specification.

This invention relates to a shock absorber and especially to a device capable of absorbing both shocks and rebound movements in a vehicle.

One of the objects of the present invention is to provide a simple, substantial and cheaply manufactured shock and rebound absorber for motor vehicles and the like, whereby sudden shocks and vibrations caused by obstructions or undulations in a road surface may be largely absorbed, and especially to provide a shock absorber which is adapted to cooperate with the ordinary semi-elliptical springs with which most standard vehicles are equipped.

Another object of the present invention is to provide a shock absorber in which all shocks and vibrations are absorbed by spring action solely; further to provide a rigid housing in which the springs and entire mechanism is inclosed and protected from dust, grit and moisture.

Another object is to so construct the shock absorber that the inclosed parts may be readily lubricated.

Another object of the invention is to provide a shock absorber which absolutely prevents all lateral movement or side sway and which may be installed on practically any car without cutting the frame or changing the springs in any manner.

Another object of the invention is to provide means for rigidly connecting a pair of shock absorbers whether they be placed in the front or rear of the car thus further securing and bracing the springs and car against lateral movement.

Further objects will hereinafter appear.

The invention consists of the parts and the construction, combination and arrangement of parts as hereinafter more fully described and claimed, having reference to the accompanying drawings, in which—

Fig. 1 is a central vertical longitudinal section through the shock absorber showing it attached to the frame and spring of the vehicle.

Fig. 2 is a cross section on line 2—2 of Fig. 1.

Fig. 3 is a rear view of a vehicle showing the bracing connection employed between a pair of shock absorbers.

Referring to the drawings in detail, A indicates a cylinder on which is secured a pair of heads 2 and 3, one being disposed at each end of the cylinder. Formed on the rear side of the cylinder and near the lower end thereof is a vertically extending slot 4, and formed on the exterior side of the cylinder just above said slot is a pad or reinforced extended section 5 which is drilled and adapted for the reception of a bracket plate 6 carrying an arm 7 which extends into the forward end of the frame 8 of the vehicle, being secured thereto by bolts 9 or the like. The cylinder is in this manner rigidly attached either to the front or rear end of the main frame of a vehicle, and lug 10 formed on the front side of each cylinder is provided for the purpose of tying and bracing the cylinders with relation to each other, this being accomplished by means of a rod 11 which extends through the lugs and is secured therein by means of nuts 12. (See Figs. 1 and 3.) Slidably mounted interior of the cylinder is a piston 14 and extending through the head members and the piston is a rod 15 which is secured to the head members 2 and 3 by means of nuts 16 and 17. The piston 14 is slidably mounted upon the rod and is also slidably mounted within the cylinder. The piston is provided with a lug 18 which extends through the slot 4. This lug is fork-shaped as at 19 and is perforated to receive a bolt 20 which is secured between the ears of the lug 18 by means of nuts 21. The pin 20 passes through the eye of the leaf spring shown at 22 and it thus forms a coupling or connection between the frame and the spring, that is, the cylinder proper is rigidly secured to the frame 8 by means of the pad 5, the plate 6 and the arm 9, while the piston 14 is secured to the spring 22 by means of the projecting lug 18. For the purpose of resisting the movement of the piston 14 with relation to the cylinder a series of coil springs 24, 25, 26 and 27 are provided. The springs 24 and 25 are interposed between the top of the piston and a nut or cap 28 secured to the rod 15 and the tension of the springs 24 and 25 is varied by changing the position of the cap 28. This is accomplished by threading the rod 15 and the cap, and it is therefore only necessary to turn the bolt 15 in one direction or another to increase or decrease the tension of the springs 24 and 25. These springs in conjunction with the semi-elliptical springs 22 carry the normal load of the vehicle and they also cushion any shocks or vibrations imposed thereon. The spring 27 is interposed between the bottom of the piston and the cap 3 and is employed for the purpose of absorbing excess rebound movements. The spring 26 is interposed between the top of the piston and a nut 30 which is also secured on the rod 15. The spring 26 is comparatively heavy and is only provided for the purpose of absorbing excess shocks.

For the purpose of retaining the springs 24, 25, 26 and 27 in proper position, I cup the upper end of the piston and the lower side of the cap 28. This structure partially incloses the springs and thereby serves as a means for positively holding the same in alignment and in proper operating position. The spring 26 does not reach the nut 30 so it is only engaged by the nut when the springs 24 and 25 have been compressed to their maximum limit. Further movement or compression is thus taken up by the spring 26 and breakage or overloading of the springs 24 and 25 is thus obviated.

For the purpose of properly guiding the piston 14 with relation to the rod 15 and the cylinder, I provide bearing members 32. These bearings are in the form of bushings and are suitably secured in the piston, for instance, by a lower head member such as indicated at 33. For the purpose of insuring a proper lubrication, an oil groove 34 is provided. This receives oil from the central passage 35 formed in the rod which may be filled from time to time by unscrewing the nut or cap 17. Further lubrication, for instance between the interior surface of the cylinder and the exterior surface of the piston, is taken care of by an ordinary oil or grease cup as at 38.

From the foregoing description it can be seen that the springs and other mechanism employed are completely inclosed within the cylinder A by means of the caps 2 and 3, thus excluding dust, grit, moisture, etc. Further that all parts employed are thoroughly lubricated thus reducing friction to a minimum. Rigidity is obtained first by providing comparatively long pistons and cylinders. Secondly, by tying the cylinders together as by means of the rods 11. Third, by rigidly attaching the cylinders to the main frame as at 8 and 9. Positive alignment is in this manner obtained and wear of the connected parts reduced to a minimum, lateral movement or sway being of course entirely obviated.

A shock absorber constructed and applied as here shown materially reduces the amount of vibration transmitted to the main frame of the vehicle. This is due to the cooperation of the springs 24 and 25 with the semi-elliptical springs 22. It also materially reduces excess shocks and rebounds as the load or force exerted under such conditions is transmitted to a larger spring area. The life of the car, as well as the mileage of the tires, is thus materially increased and one is above all assured of comfortable and smooth riding, this being materially assisted by reducing the side sway of the car to a minimum.

While certain features of the present invention are more or less specific in construction, I wish it understood that various changes in design, form and proportion may be resorted to within the scope of the appended claims, similarly that the materials and finish of the several parts employed may be such as the experience and judgment of the manufacturer may dictate or varying conditions may demand.

Having thus described my invention, what I claim and desire to secure by Letters Patent is—

1. In a device of the character described, the combination with the main frame of a vehicle and the springs whereby the frame is supported, of a cylinder secured to the frame, a head member on each end of the cylinder, a piston in the cylinder, a spring in each end of the cylinder engaging the piston, a rod extending through the cylinder and secured by the head members, means permitting turning movement of the rod, means actuated by the turning movement of the rod for increasing or decreasing the tension of the springs within the cylinder, and a connection between the vehicle spring and the piston.

2. In a device of the character described, the combination with the main frame of a vehicle and the springs whereby the frame is supported, of a cylinder secured to the frame, a head member on each end of the cylinder, a piston in the cylinder, a spring in each end of the cylinder engaging the piston, a rod extending through the cylinder and secured to the cylinder members, means for turning the rod, threads formed on one end of the rod, a nut on the rod engageable with one of the springs within the cylinder and adapted to increase or decrease the tension thereof, and a connection between the vehicle spring and the piston.

3. In a device of the character described, the combination with the main frame of a vehicle and the springs whereby the frame is supported, of a cylinder rigidly secured to the frame, a piston slidably mounted in the cylinder, a slot formed in the lower end of the cylinder, a lug on the piston projecting through said slot, means for connecting said lug with the vehicle spring, a spring in each end of the cylinder engaging the piston, means for increasing or decreasing the tension of said springs, said means comprising a rod extending through the piston and the cylinder and secured by the cylinder heads, a thread formed on one end of the rod, a cap carried by the rod and adapted to be advanced or retracted by turning movement of the rod to increase or decrease the tension of the springs within the cylinder.

4. In a device of the character described, the combination with the main frame of a vehicle and the springs whereby it is supported, of a pair of cylinders secured to the frame, one on each side thereof, a piston reciprocally mounted in each cylinder, a connection between each piston and the vehicle springs, a brace connection between the cylinders, springs interposed between each end of each cylinder and each piston, a rod extending longitudinally through each cylinder and piston and stationary with relation to the pistons, and means actuated by turning movement of the rods for adjusting the tension of the springs.

5. In a device of the character described, the combination with the main frame of a vehicle and the springs whereby it is supported, of a pair of cylinders secured to the frame, one on each side thereof, a piston reciprocally mounted in each cylinder, a connection between each piston and the vehicle springs, a brace connection between the cylinders, springs interposed between each end of each cylinder and each piston, and means for increasing or decreasing the tension of said springs, the last named means comprising a rod extending through each cylinder and piston, and stationary with relation to each piston, a thread formed on the upper end of each rod, and a nut carried by the threaded portion and engageable with the uppermost springs.

6. In a device of the character described, the combination with the main frame of a vehicle and the springs whereby the frame is supported, of a cylinder rigidly secured to the frame, a piston slidably mounted in the cylinder, a slot formed in the lower end of the cylinder, a lug on the piston projecting through said slot, means for connecting said lug with the vehicle spring, a spring in each end of the cylinder engaging the piston, means for increasing or decreasing the tension of said springs, an auxiliary bumper spring carried by one end of the piston, and a nut on the rod with which said spring is adapted to engage when subjected to excess shocks.

7. In a device of the character described, a cylinder, a head member on each end of the cylinder, a rod extending longitudinally through the cylinder and centrally positioned with relation thereto, means for securing the rod between the head members, a piston slidably mounted upon the rod within the cylinder, a pair of bearing members, one at each end of the piston engaging the rod, and a spring interposed between each end of the cylinder and the piston.

8. In a device of the character described, a cylinder, a head member on each end of the cylinder, a rod extending longitudinally through the cylinder and centrally positioned with relation thereto, means for securing the rod between the head members, a piston slidably mounted upon the rod within the cylinder, a pair of bearing members, one at each end of the piston engaging the rod, a spring interposed between each end of the cylinder and the piston, and means in one end of the cylinder for increasing or decreasing the tension of the springs.

In testimony whereof I have hereunto set my hand in the presence of two subscribing witnesses.

ZELMERE P. LOYD.

Witnesses:
 GORDON W. GIBSON,
 R. J. GORMAN.